US011654759B2

(12) United States Patent
Singh et al.

(10) Patent No.: US 11,654,759 B2
(45) Date of Patent: May 23, 2023

(54) SEALING APPARATUS FOR A LATERALLY-SLIDING DOOR

(71) Applicant: Rivian IP Holdings, LLC, Plymouth, MI (US)

(72) Inventors: Rajinder Singh, Plymouth, MI (US); Rick Bargardi, Grosse Ile, MI (US); Mohit Nagallapuram, Northville, MI (US); Jeffrey D. Elliott, Novi, MI (US); David Tobon, Northville, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 314 days.

(21) Appl. No.: 17/146,587

(22) Filed: Jan. 12, 2021

(65) Prior Publication Data

US 2022/0219518 A1    Jul. 14, 2022

(51) Int. Cl.
  *B60J 10/86*    (2016.01)
  *B60J 10/80*    (2016.01)
  (Continued)

(52) U.S. Cl.
  CPC ............... *B60J 10/86* (2016.02); *B60J 5/06* (2013.01); *B60J 10/15* (2016.02); *B60J 10/27* (2016.02); *B60J 10/80* (2016.02)

(58) Field of Classification Search
  CPC ... B60J 10/86; B60J 10/15; B60J 10/27; B60J 10/00; B60J 10/20; B60J 10/25;
  (Continued)

(56) References Cited

U.S. PATENT DOCUMENTS 4,541,201 A * 9/1985 Nishimiya ................. B60J 5/06
                                                    49/484.1
2017/0036523 A1* 2/2017 Tooker .................... B60J 1/1853
(Continued)

FOREIGN PATENT DOCUMENTS

JP        60206724 A  * 10/1985  ............. B60J 7/195
JP        02092785 A  *  4/1990  ............. B62D 25/04
JP        6205944 B2  * 10/2017  ............. B60J 10/86

OTHER PUBLICATIONS

Tobisawa, "To provide a seal structure of a slide door", Published: Feb. 5, 2015, Edition: JP-6205944-B2 (Year: 2015).*
(Continued)

*Primary Examiner* — Dennis H Pedder
*Assistant Examiner* — Joyce Eileen Hill
(74) *Attorney, Agent, or Firm* — Clements Bernard Walker; Christopher L. Bernard

(57) ABSTRACT

Disclosed embodiments include seals, vehicles, and methods for providing a seal for a door that is configured to travel laterally relative to a door opening. In an illustrative embodiment, a seal assembly includes first and second upper and lower lateral seals configured to seal outer and inner surfaces of the upper and lower edges of the door, respectively, as the door laterally moved into a closed position. The seal includes first and second front and rear transverse seals configured to seal the outer and the inner surfaces of the front and rear edges of the door, respectively, in response to the door laterally moving into the closed position.

20 Claims, 7 Drawing Sheets

(51) Int. Cl.
*B60J 10/27* (2016.01)
*B60J 10/15* (2016.01)
*B60J 5/06* (2006.01)

(58) Field of Classification Search
CPC ..... B60J 10/80; B60J 10/87; B60J 5/06; B60J 5/04; B60R 13/06; B60P 1/00; B62D 33/023; B62D 33/027; E60B 7/22
USPC ............. 296/146.9, 149, 155; 49/426, 475.1, 49/484.1, 498.1
See application file for complete search history.

(56) References Cited

U.S. PATENT DOCUMENTS

| | | | |
|---|---|---|---|
| 2019/0047386 A1* | 2/2019 | Kanasugi | B60J 5/0463 |
| 2020/0270938 A1* | 8/2020 | Ma | B60J 10/86 |

OTHER PUBLICATIONS

Hiroshi et al., "Pillar Mounting Structure for Vehicle", Published: Apr. 3, 1990, Edition: JP02092785A (Year: 1990).*
Kunio et al., "Weather Strip for Sunshine Roof", Published: Dec. 18, 1985, Edition: JP60206724A (Year: 1985).*

* cited by examiner

SEALING APPARATUS FOR A LATERALLY-SLIDING DOOR

INTRODUCTION

The present disclosure relates to sealing a laterally-sliding door.

The statements in this section merely provide background information related to the present disclosure and may not constitute prior art.

Vehicles such as passenger cars, trucks, and vans frequently include two or more hinged doors. These doors pivot about a hinge between open and closed positions. A flexible gasket is typically secured to edges of the door that will engage a door recess when the door is pivoted into a closed position. The flexible gasket seals an interior of the vehicle against the elements, including moisture and wind.

Many vehicles, such as vans and panel trucks, also include a door that slides or rolls in a generally lateral direction. Many such vehicles include an articulated track in which opening the door causes the door to move outwardly from the door recess as it is first opened. Moving the door outwardly opens seals between the door and the door recess so that the seals will not be subject to friction as the door is moved laterally to try to prevent damage to the seals. These doors, as well as doors that travel laterally within a pocket, frequently uses brush-type seals along upper and/or lower edges of the door. The bristles of the brush-type seals can flex to withstand damage that compressible rubberized seals may not be able to withstand while sliding back and forth along upper or lower surfaces of a door mount. However, brushes are, by nature, porous and thus may not seal the door against moisture and wind.

BRIEF SUMMARY

Disclosed embodiments include apparatuses, vehicles, and methods for sealing a laterally-sliding door.

In an illustrative embodiment, a seal assembly includes upper lateral seals for a door configured to travel laterally relative to a door opening. The upper lateral seals include a first upper seal configured to seal an outer surface of an upper edge of the door against the door opening and a second upper seal configured to seal an inner surface of the upper edge of door against the door opening as the door laterally moves between an open position and the closed position. Lower lateral seals include a first lower seal configured to seal the outer surface of a lower edge of the door against the door opening and a second lower seal configured to seal the inner surface of the lower edge door against the door opening as the door laterally moves between the open position and the closed position. Front transverse seals include a first front seal configured to seal the outer surface of a front edge of the door against the door opening and a second front seal configured to seal the inner surface of the front edge of door against the door opening in response to the door laterally moving into the closed position. Rear transverse seals include a first rear seal configured to seal the outer surface of the door adjacent to the rear edge of the door against the door opening and a second rear seal configured to seal the inner surface of the door adjacent to the rear edge of the door against the door opening in response to the door laterally moving into the closed position.

In another illustrative embodiment, a vehicle includes a vehicle body. A drive system is supported by the vehicle body and is configured to control one or more wheels of the vehicle to motivate, accelerate, decelerate, stop, and steer the vehicle. A cabin is incorporated in the vehicle body and is configured to receive a payload chosen from at least one of an occupant and cargo and accessible by a laterally-travelling door received in a door opening. A seal assembly for the door includes upper lateral seals including a first upper seal configured to seal an outer surface of an upper edge of the door against the door opening and a second upper seal configured to seal an inner surface of the upper edge of door against the door opening as the door laterally moves between an open position and the closed position. Lower lateral seals include a first lower seal configured to seal the outer surface of a lower edge of the door against the door opening and a second lower seal configured to seal the inner surface of the lower edge door against the door opening as the door laterally moves between the open position and the closed position. Front transverse seals include a first front seal configured to seal the outer surface of a front edge of the door against the door opening and a second front seal configured to seal the inner surface of the front edge of door against the door opening in response to the door laterally moving into the closed position. Rear transverse seals include a first rear seal configured to seal the outer surface of the door adjacent to the rear edge of the door against the door opening and a second rear seal configured to seal the inner surface of the door adjacent to the rear edge of the door against the door opening in response to the door laterally moving into the closed position.

In a further illustrative embodiment, a method is provided for sealing a door that is configured to travel laterally relative to a door opening. Upper lateral seals are provided including a first upper seal configured to seal an outer surface of a front edge the door to the door opening and a second upper seal configured to seal an inner surface of the front edge of the door to the door opening as the door moves between an open position and the closed position. Lower lateral seals are provided including a first lower seal configured to seal the outer surface of a lower edge of the door to the door opening and a second lower seal configured to seal the inner surface of the lower edge of the door to the door opening as the door moves between the open position and the closed position. Front transverse seals are provided including a first front seal configured to seal the outer surface of the door adjacent to a front edge of the door to the door opening and a second front seal configured to seal the inner surface of the door adjacent to the front edge of the door to the door opening in response to the door moves into the closed position. Rear transverse seals are provided including a first rear seal configured to seal the outer surface of the door adjacent to a rear edge of the door to the door opening and a second rear seal configured to seal the inner surface of the door adjacent to the rear edge of the door to the door opening in response to the door moves into the closed position.

Further features, advantages, and areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. The components in the figures are not necessarily to scale, with emphasis instead being placed upon illustrating the principles of the disclosed embodiments. In the drawings.

DETAILED DESCRIPTION

The following description is merely illustrative in nature and is not intended to limit the present disclosure, application, or uses. It will be noted that the first digit of three-digit reference numbers corresponds to the first digit the figure number figure in which the element first appears.

The following description explains, by way of illustration only and not of limitation, various embodiments of seals, vehicles, and methods for providing a seal for a door that is configured to travel laterally relative to a door opening.

Figure 1:
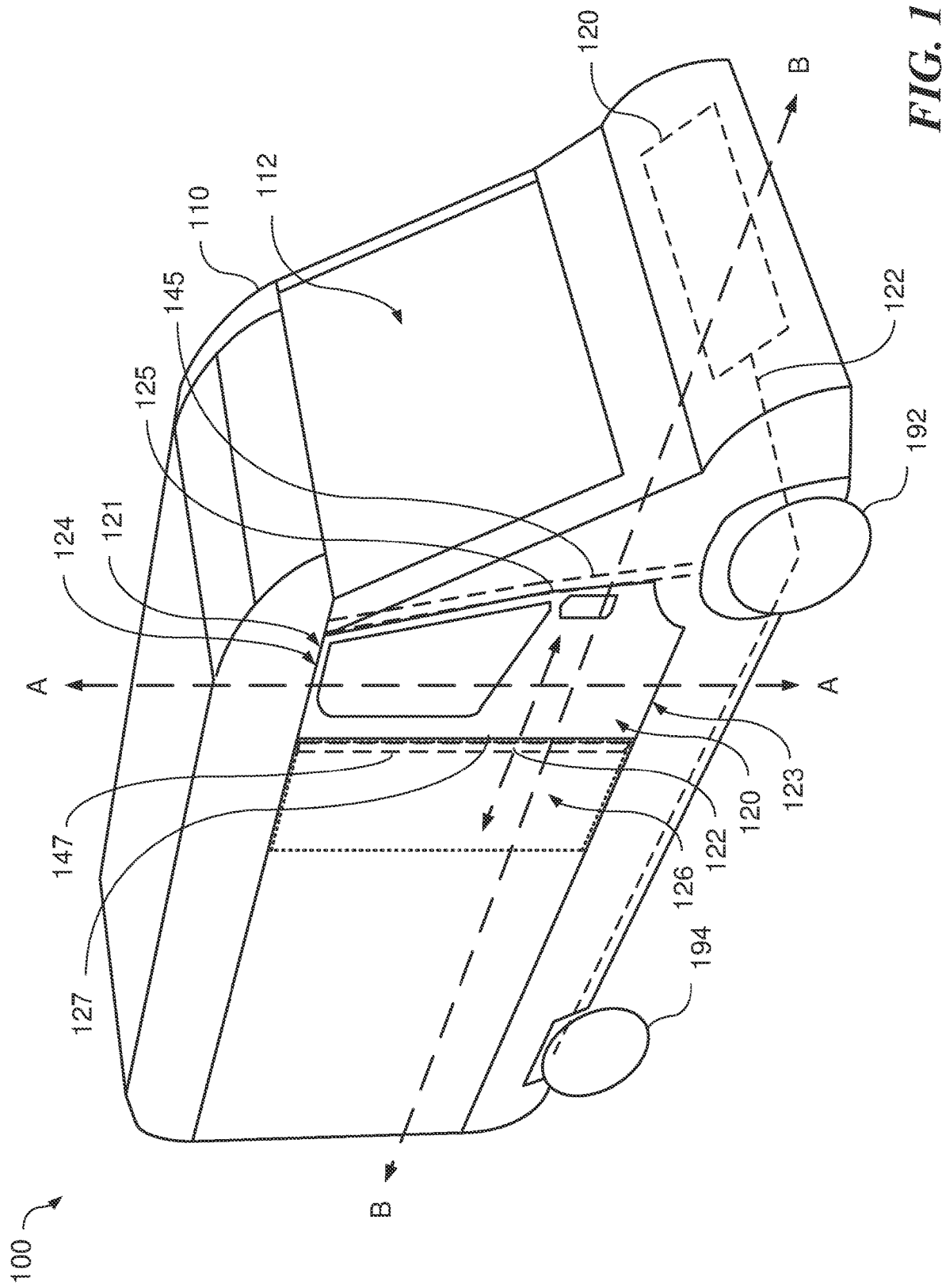
FIG. 1 is a perspective view of a vehicle including a laterally-travelling door.

Referring additionally to FIG. 1, in various embodiments a vehicle 100 has a body 110 that incorporates a cabin 112 that accommodates a payload that includes occupants and/or cargo. The body 110 includes a door 120 that is configured to travel laterally along an axis 122 to close a door opening 124 formed in the body 110. When the door 120 is opened, the door 120 is receivable within a pocket 126 (represented in dotted lines in FIG. 1) incorporated within the body 110 and provides access to the interior of the cabin 112 to allow occupants to enter and exit the vehicle 100 and/or to allow cargo to be loaded into and removed from the vehicle 100. When the door 120 is closed, the door 120 is positioned between a front door pillar 145, or "A pillar," and a rear door pillar 147, or "B pillar" (both of which are represented by dotted lines in FIG. 1). Using a seal assembly as described below, the door 120 seals the door opening 124 to seal the cabin 112 from wind, moisture, and other elements. As further described below, seals are provided to seal the door 120 against the door opening 124 at interior and exterior surfaces at an upper edge 121, a lower edge 123, a front edge 125, and a rear edge 127 of the door 120 against the door opening 124.

In various embodiments, the vehicle 100 also includes a drive system 190. The drive system 190 is configured to power the vehicle 190. The drive system 190 may include one or more electric motors, an internal-combustion engine, a hybrid electric/internal-combustion engine, or another type of engine to drive the front wheels 192 and/or the rear wheels 194 to motivate and accelerate the vehicle 190. The drive system 190 also may include steering and braking systems to control attitude and rotation of the front wheels 192 and/or the rear wheels 194 to steer, decelerate, and stop the vehicle 100. In various embodiments, the drive system 190 of the vehicle 100 may be manually controllable by an operator within the cabin 112 or the drive system 190 may assist the operator in controlling the vehicle 100. In various embodiments, the drive system 190 may provide automated driving to autonomously control the vehicle 100. In various embodiments, the vehicle 100 may carry one or more occupants or may operate autonomously without an operator.

Figure 3:
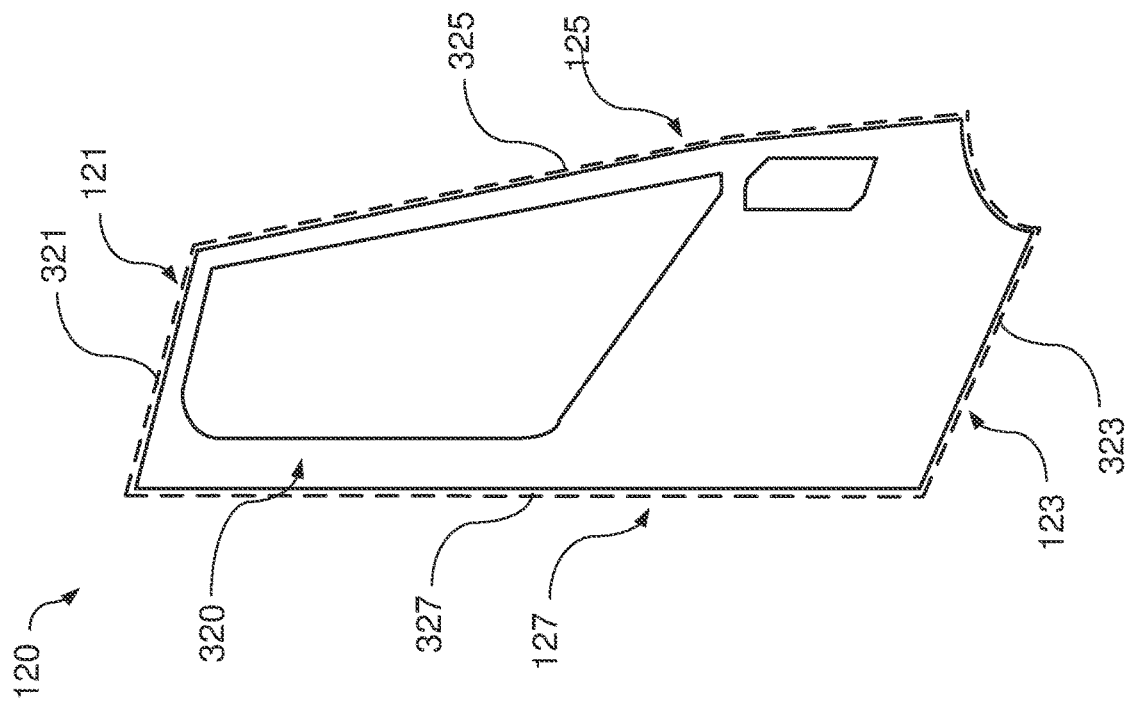
FIG. 3 is a perspective view of the outer surface of the door of FIG. 1 and a number of outer seals around the periphery of the door.
Figure 2:
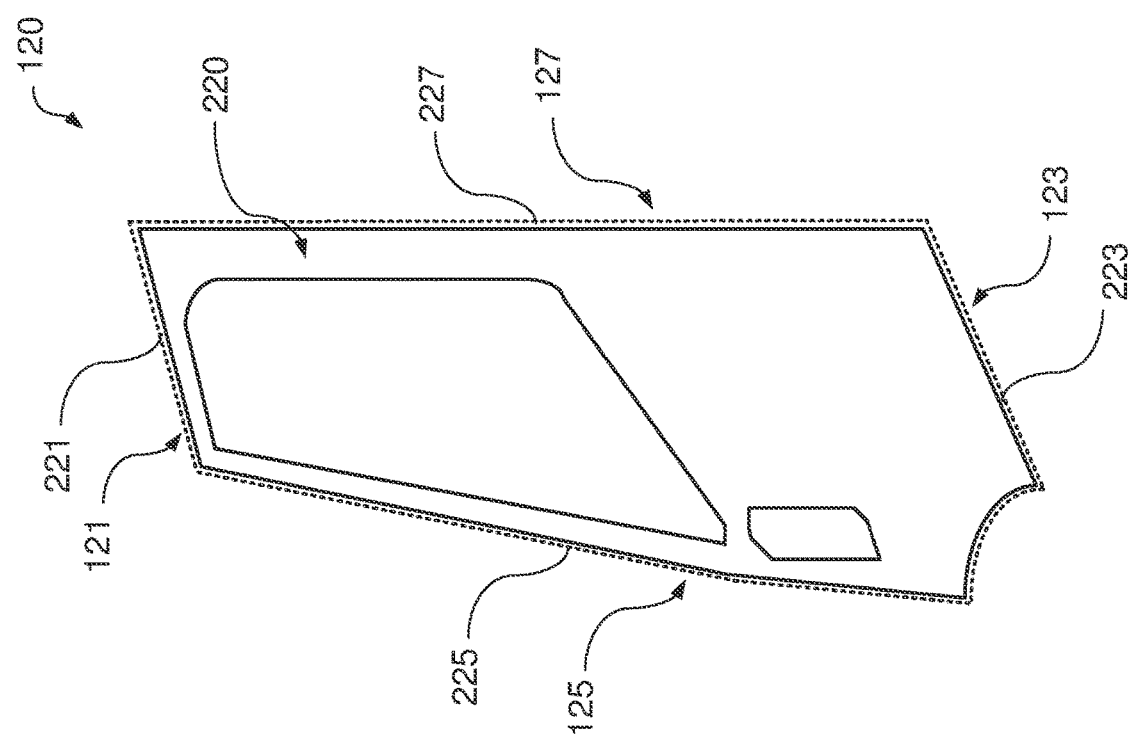
FIG. 2 is a perspective view of the inner surface of the door of FIG. 1 and a number of inner seals around the periphery of the door.

Referring additionally to FIGS. 2 and 3, in various embodiments, the door 120 is sealed against the door opening 124 (FIG. 1) using a seal assembly that includes both inner and outer seals. As described further below, the inner seals seal an inner surface 220 of the door 120 against an inner surface of the door opening 124 and the outer seals seal the door 120 against an outer surface of the door opening 124. Providing dual seals around the inner and outer surfaces may more effectively seal the cabin 112 of the vehicle 100 (FIG. 1) from the elements, including wind and moisture, and may also more effectively seal the cabin 100 from road and wind noise. The dual seals provide the cabin with what is termed "Level 2" sealing in separately sealing the inner and outer surfaces of the door 120.

Referring additionally to FIG. 2, the inner seals that seal the inner surface 220 of the door 120 against the door opening 124 (FIG. 1) include an inner upper lateral seal 221 along the upper edge 121 of the door 120 as further described below with reference to FIG. 4. The seals 221, 223, 225, and 227 are represented in FIG. 2 with dotted lines around a periphery of the door 120. An inner lower lateral seal 223 along the lower edge 123 of the door 120 seals the inner surface 220 of the door 120 against the door opening 124 as further described below with reference to FIG. 5. In various embodiments, the inner upper lateral seal 221 and the inner lower lateral seal 223 slide along surfaces of the door opening 124. The inner upper lateral seal 221 and the inner lower lateral seal 223 deform to engage the surfaces of the door opening 124 to provide the seal, as further described below. An inner front transverse seal 225 along the front edge 125 of the door 120 seals the inner surface 220 of the door 120 against the door opening 124 as further described below with reference to FIG. 6. An inner rear transverse seal 223 along the rear edge 127 of the door 120 seals the inner surface 220 of the door 120 against the door opening 124 as further described below with reference to FIG. 7. The inner front transverse seal 225 and the inner rear transverse seal 227 deform to engage surfaces of the door opening 124 when the door 120 is in a closed position, as further described below.

Referring additionally to FIG. 3, the outer seals that seal the outer surface 320 of the door 120 against the door opening 124 include an outer upper lateral seal 321 along the upper edge 121 of the door 120 as further described below with reference to FIG. 4. The seals 321, 323, 325, and 327 are represented in FIG. 3 with dashed lines around a periphery of the door 120. An outer lower lateral seal 323 along the lower edge 123 of the door 120 seals the outer surface 320 of the door 120 against the door opening 124 as further described below with reference to FIG. 5. The outer upper lateral seal 321 and the outer lower lateral seal 323 slide along surfaces of the door opening 124 and deform to engage the surfaces of the door opening 124 to provide the seal, as further described below. An outer front transverse seal 325 along the front edge 125 of the door 120 seals the outer surface 320 of the door 120 against the door opening 124 as further described below with reference to FIG. 6. An outer rear transverse seal 323 along the rear edge 127 of the door 120 seals the outer surface 320 of the door 120 against the door opening 124 as further described below with reference to FIG. 7. The outer front transverse seal 225 and the inner rear transverse seal 227 deform to engage surfaces of the door opening 124 when the door 120 is in a closed position, as further described below.

Figure 4:
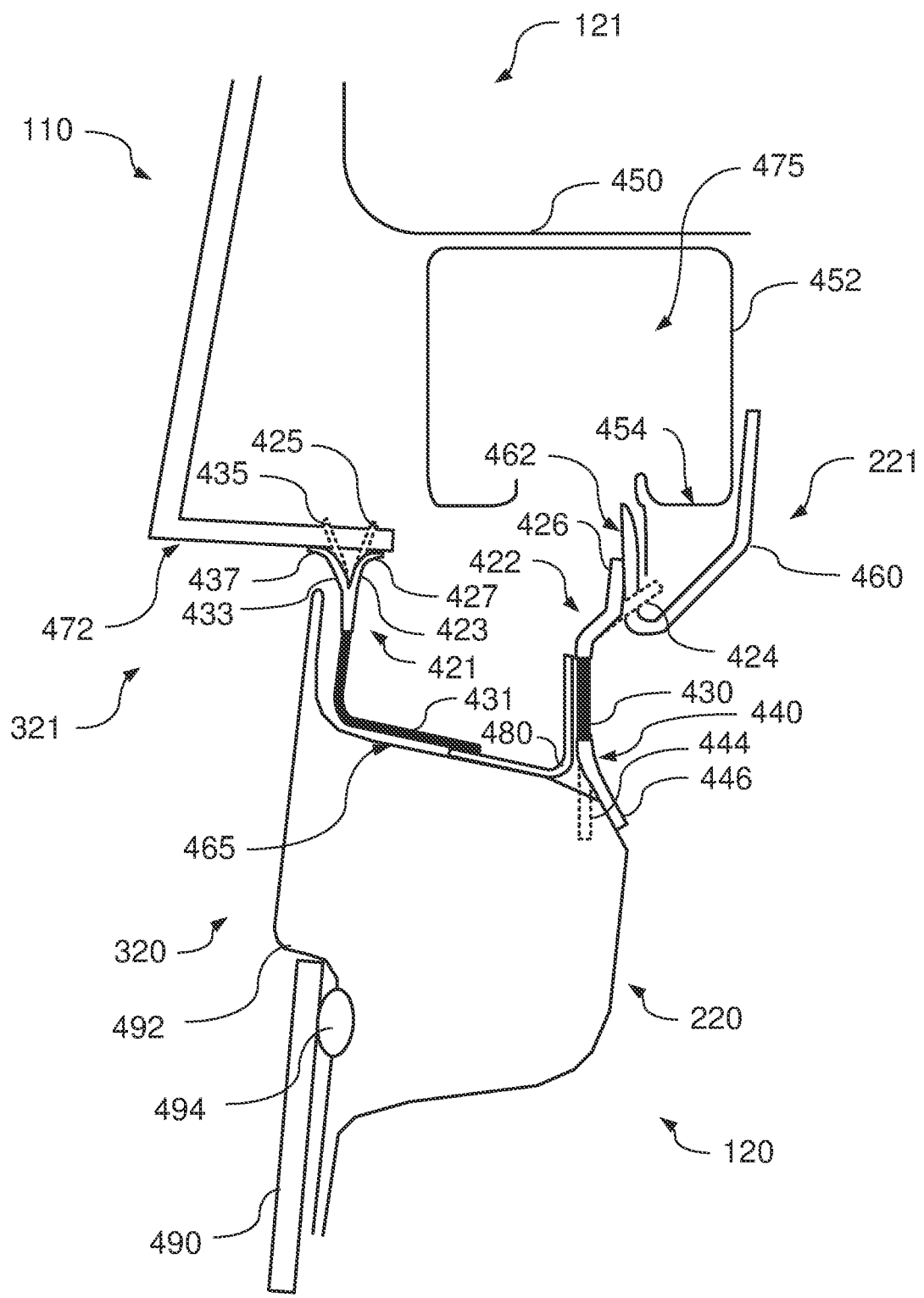
FIG. 4 is a cross-sectional view taken along section A-A of FIG. 1 of an upper edge of the door of FIG. 1.

Referring additionally to FIG. 4, in various embodiments an upper portion of the door 120 and the door opening 124 (FIG. 1) shows the door 120 mounted in a track 475 so as to be laterally-movable across the door opening 124. The door 120 is equipped with the inner upper lateral seal 221 and the outer upper lateral seal 321. The door 120 also may include a window 490 that is received in a window recess 492 and secured by one or more window seals 494.

In various embodiments the inner upper lateral seal 221 includes a deformable panel 422 to seal the door 120 against an upper surface 462 within the door opening 124. The deformable panel 422 is secured to the inner surface 220 of the door by a mount 430. The mount 430 may include a bracket, bolt, screw, clip, or other fastener joinable to and/or integrated in the inner surface 220 of the door 120. The deformable panel 422 is mounted so that, in an undeformed position 424 (represented by dotted lines in FIG. 4) the deformable panel 422 extends in a direction that would intersect the upper surface 462. The door 120 is mountable in the door opening 124, such as by mounting rollers or bearings (not shown) at a top edge 121 of the door 120 in a track 475 coupled to an upper edge 450 of the door opening 124. With the door 120 in place, the deformable panel 422 conforms to the upper surface 462 in a deformed position 426. With the deformable panel 422 in the deformed position 426, the deformable panel 422 seals the inner surface 220 of the door 120 to the upper surface 462 of the door opening 124.

In various embodiments, the upper surface 462 to which the deformable panel 422 seals may include an applique 460 that is mounted over an inner side 454 of the track 475. The applique 460 may present a smooth upper surface 462 across which the deformable panel 422 is more readily slidable with less friction and/or which may provide a better seal against the deformable panel 422 than the track 475 itself.

In various embodiments, the deformable panel 422 also may include a lower section 440 that extends from the mount 430 to further seal against the inner surface 220 of the door 120. The lower section 440 in an undeformed position 444 (represented in dotted lines in FIG. 4) would intersect the inner surface 220 of the door 120. With the door 120 installed, the lower section 440 of the deformable panel 422 is moved into a deformed position 446 that allows the lower section 440 of the deformable panel to seal against the inner surface 220 of the door 120.

In various embodiments the outer upper lateral seal 321 includes a deformable member 421 that, in various embodiments, includes a first deformable section 423 and a second deformable section 433 to engage an outer upper surface 472 of the door opening 124. The deformable member 421 is secured to the door 120 using a mount 431. The mount may include a bracket, bolt, screw, clip, or other fastener joinable to and/or integrated in the upper surface 465 of the door 120. The first deformable section 423 and the second deformable section 433 in undeformed positions 425 and 435, respectively (shown in dotted lines in FIG. 4) would intersect the outer upper surface 475. With the door 120 mounted in the track 475, the first deformable section 423 and the second deformable section 433 conform to deformed positions 427 and 437, respectively, to seal against the upper outer surface 475. Although the deformable member 421 includes two deformable sections 423 and 433, the deformable member 421 may include a single deformable member.

Thus, it will be appreciated that the inner upper lateral seal 221 seals the inner surface of the door 120 to the upper surface 462 of the door opening 124 while the outer upper lateral seal 321 seals the outer surface 320 of the door 120 to the outer upper surface 472 of the body 110. The inner upper lateral seal 221 and the outer upper lateral seal 321 thereby provide two seals between the cabin 112 (FIG. 1) and the environment outside of the vehicle 100.

In various embodiments, the upper edge 121 of the door 120 also is equipped with a channel 480 between the inner upper lateral seal 221 and the outer upper lateral seal 231. The channel 480 is configured to receive liquid, such as precipitation, that may fall between the inner upper lateral seal 221 and the outer upper lateral seal 231 when the door 120 is opened or closed. The channel 480 is configured to redirect the liquid toward, for example, the front edge 125 of the door 120. The channel 480 also may redirect the liquid toward the rear edge 127 of the door 120.

Figure 5:
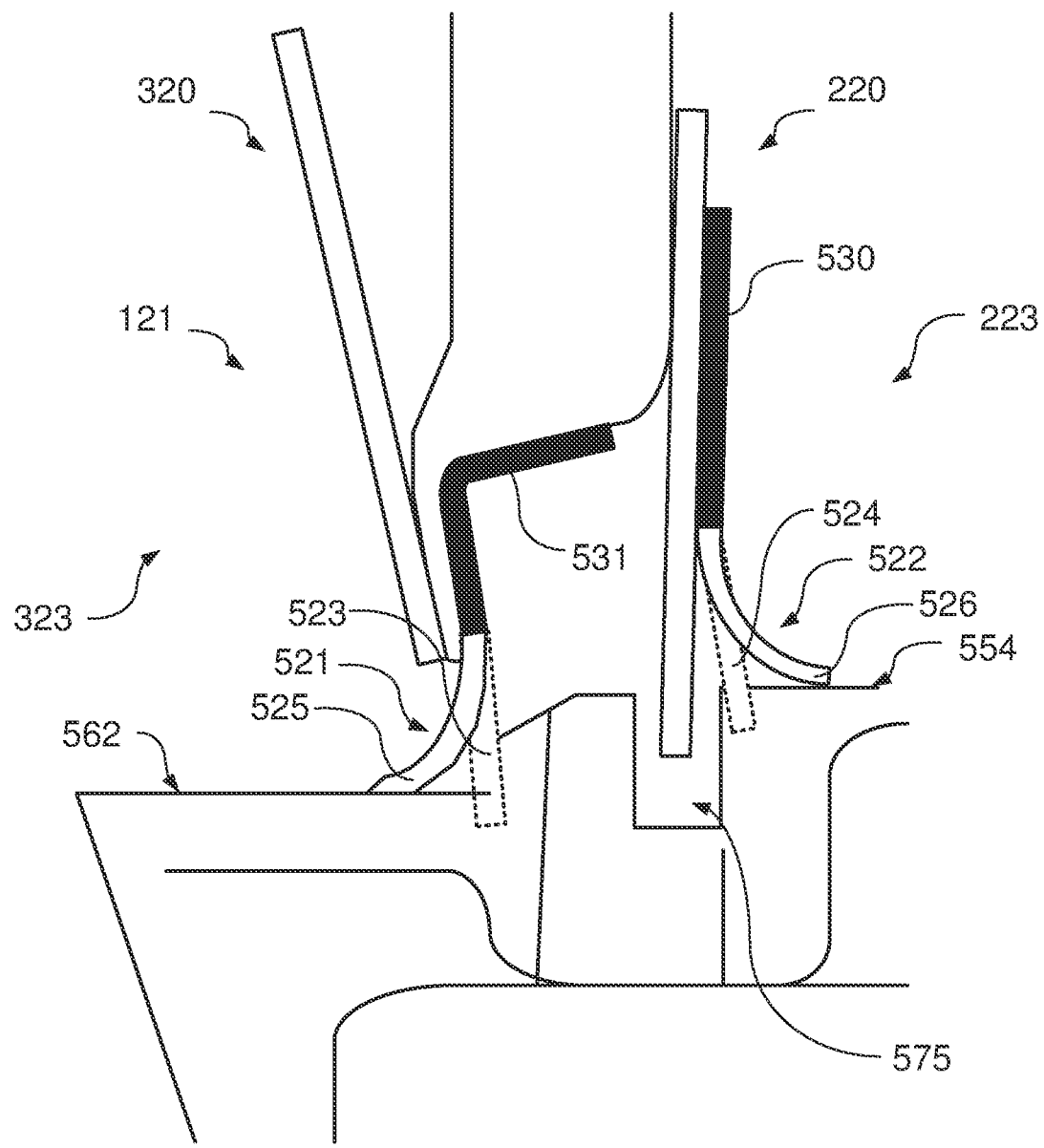
FIG. 5 is a cross-sectional view taken along section A-A of FIG. 1 of a lower edge of the door of FIG. 1.

Referring additionally to FIG. 5, a lower portion of the door 120 and the door opening 124 (FIG. 1) shows the door 120 travelling in a guide 575 to help direct the lateral travel of the door across the door opening. The door 120 is equipped with the inner lower lateral seal 223 and the outer lower lateral seal 323.

In various embodiments the inner lower lateral seal 223 includes a deformable panel 522 to seal the door 120 against a lower surface 554 of the door opening 124. The deformable panel 522 is secured to the inner surface 220 of the door by a mount 530. The mount 530 may include a bracket, bolt, screw, clip, or other fastener joinable to and/or integrated in the inner surface 220 of the door 120. The deformable panel 522 is mounted so that, in an undeformed position 524 (represented by dotted lines in FIG. 5) the deformable panel 522 extends in a direction that would intersect the lower surface 554. With the door 120 in place, the deformable panel 522 conforms to the lower surface 554 in a deformed position 526. With the deformable panel 522 in the deformed position 526, the deformable panel 452 seals the inner surface 220 of the door 120 to the lower surface 554 of the door opening 124.

In various embodiments, the outer lower lateral seal 323 includes a deformable panel 521 to engage an outer lower surface 562 of the door opening 124. The deformable panel 521 is secured to the lower edge 121 of the door 120 using a mount 531. The mount may include a bracket, bolt, screw, clip, or other fastener joinable to and/or integrated in the lower edge 123 of the door 120. The deformable panel 521 in an undeformed position 523 (shown in dotted lines in FIG. 5) would intersect the outer lower surface 562. With the door 120 mounted in the door opening, the deformable panel 521 conforms to the outer lower surface 562 in a deformed position 525 to seal against the lower outer surface 562.

In various embodiments the inner lower lateral seal 223 seals the inner surface of the door 120 to the lower surface 554 of the door opening 124 while the outer lower lateral seal 323 seals the outer surface 320 of the door 120 to the outer lower surface 562 of the body 110. The inner lower lateral seal 223 and the outer lower lateral seal 323 thereby provide two seals between the cabin 112 (FIG. 1) and the environment outside of the vehicle 100.

Referring again to FIGS. 2 and 3, in various embodiments the front edge 125 and the rear edge 127 of the door 120 include transverse seals 225, 325, 227, and 327 that seal the door 120 to the door opening 124. As previously described, the lateral door seals 221, 321, 223, and 323 are parallel to the axis 122 (FIG. 1) of movement of the door 120 and thus are designated lateral seals. The lateral door seals 221, 321, 223, and 323 at least partially extend between the door 120 and the door opening 124 as the door 120 travels laterally across the door opening 124. By contrast, the transverse seals 225, 325, 227, and 327 are transverse to the axis 122 of movement of the door 120 and thus are designated transverse seals. The transverse seals 225, 325, 227, and 327 are positioned to seal the door 120 and the door opening 124 in response to the door 120 moving into a closed position.

Figure 6:
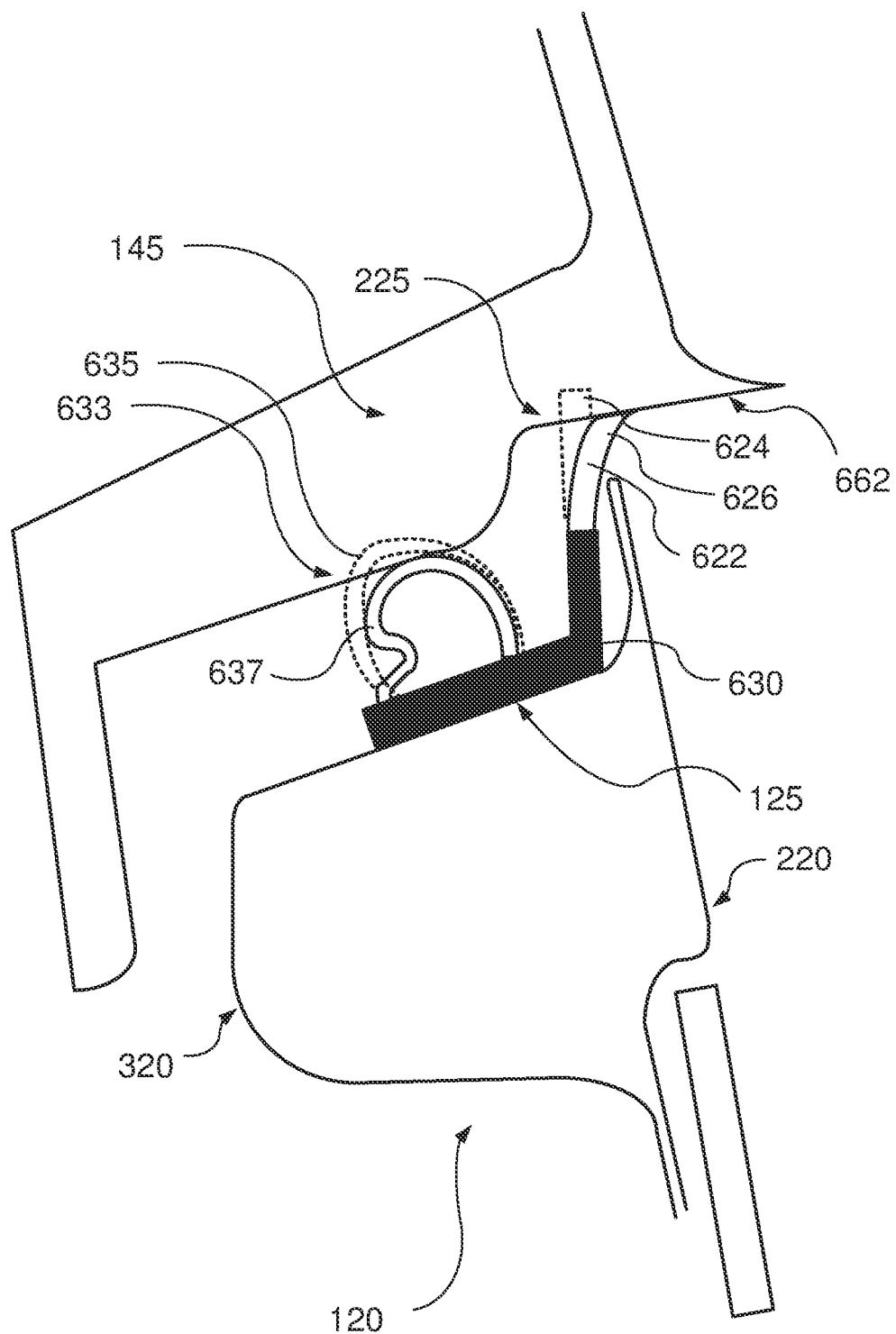
FIG. 6 is a cross-sectional view taken along section B-B of a front edge of the door of FIG. 1.
Figure 7:
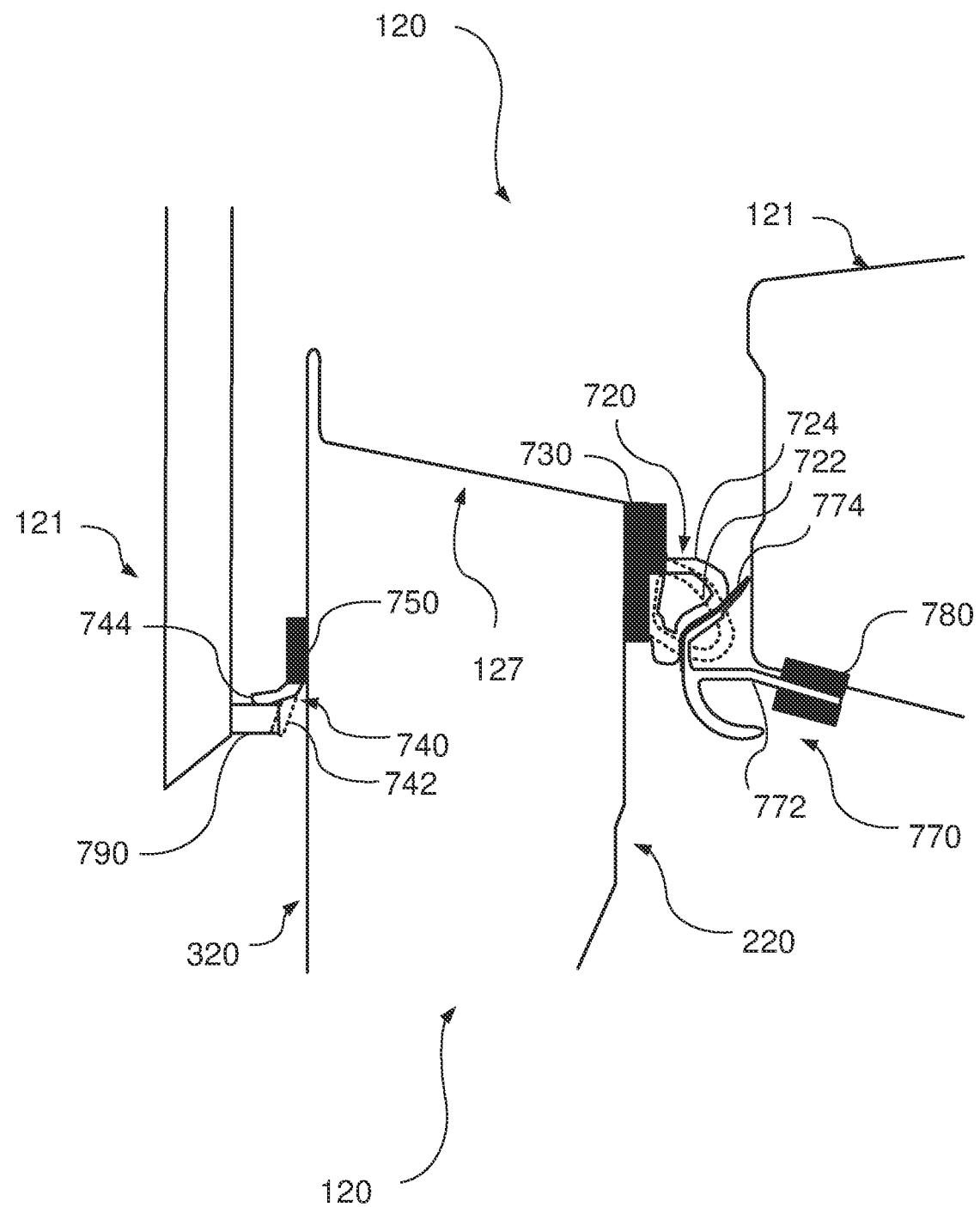
FIG. 7 is a cross-sectional view taken along section B-B of a rear edge of the door of FIG. 1.

Referring additionally to FIG. 6, in various embodiments the door 120 is in a closed position, with the front edge 125 of the door 120 sealed by the inner front transverse seal 225 and the outer front transverse seal 325 against the front door pillar 145. The inner front transverse seal 225 includes a deformable panel 622 to seal the door 120 against an inner surface 662 of the front door pillar 145. The deformable panel 622 is secured to the front edge 125 of the door 120 by a mount 630. The mount 630 may include a bracket, bolt, screw, clip, or other fastener joinable to or integrated in the in the front edge 125 of the door 120. The deformable panel 622 is mounted so that, in an undeformed position 624 (represented by dotted lines in FIG. 6) the deformable panel 622 extends toward the front door pillar 145 such that the deformable panel 622 would intersect the inner surface 662 of the front door pillar 145. When the door 120 is moved into a closed position, the deformable panel 622 conforms to the inner surface of the front door pillar 145 in a deformed position 626. With the deformable panel 622 in the deformed position 626, the deformable panel 622 seals the inner surface 220 of the door 120 to the inner surface 662 of the front door pillar 145.

The outer front transverse seal 325 includes a compressible member 633 secured to the front edge 125 of the door by the mount 630 or a separate attachment device. The compressible member 633 in an undeformed configuration 635 (represented by dotted lines in FIG. 6) extends toward and would intersect the inner surface 662 of the front door pillar 145. When the door 120 is moved into a closed position, the compressible member 633 conforms to a compressed configuration 637. With the compressible member 633 in the compressed configuration 637, the compressible member 633 forms a seal between the front edge 125 of the door 120 and the inner surface 662 of the front door pillar 145.

Thus, it will be appreciated that the deformable panel 622 of the inner front transverse seal 225 provides a seal on an inner side 220 of the door 120 nearer the cabin 112 of the vehicle 100 (FIG. 1) and the compressible member 633 of the outer front transverse seal 325 provides a seal toward the outer side 320 of the door 120. The inner front transverse seal 225 and the outer front transverse seal 325 thereby provide two seals between the cabin 112 and the environment outside of the vehicle 100.

Referring additionally to FIG. 7, the door 120 again is in a closed position, with the rear edge 127 of the door 120 sealed by the inner rear transverse seal 227 and the outer rear transverse seal 327 against the rear door pillar 147. The inner rear transverse seal 227 includes a compressible member 720 that is secured to the door 120 at the rear edge 127 or on the inner surface 220 of the door 120 adjacent to the rear edge 127. The compressible member 720 is secured to the door with a mount 730. The mount 730 may include a bracket, bolt, screw, clip, or other fastener joinable to and/or integrated in the in the inner surface 220 or the rear edge 127 of the door 120.

In various embodiments, the compressible member 720 may engage the rear door pillar 147 or a sealing bracket 770 that extends from the rear door pillar. It will be appreciated that, so as not to prevent the door 120 from moving laterally into the pocket 126 when the door 120 is an open position, a surface to which the compressible member seals desirably is on a side of the rear door pillar 147 or a similar surface. Although the rear door pillar 147 may be shaped to present a surface engageable by the compressible member 720, adding a sealing bracket 770 may simplify the manufacture of the rear door pillar 147 to present a surface to engage the compressible member. The sealing bracket 770 is secured to the rear door pillar 147 with a mount 780. The mount 780 may include a bracket or a clip joinable to and/or integrated in the rear door pillar 147. The sealing bracket 770 may include a support body 772 that supports a sealing member 774. The support body 772 may be comprised of a metal or another rigid material while the sealing member 774 may be comprised of a sealing material like other deformable panels or compressible members herein described.

The compressible member 720 in an undeformed configuration 722 (represented by dotted lines in FIG. 7) extends toward and would intersect the sealing bracket 770 extending from the rear door pillar 147. When the door 120 is moved into a closed position, the compressible member 720 conforms to a compressed configuration 724. With the compressible member 720 in the compressed configuration 724, the compressible member 720 forms a seal at the rear edge 125 of the door 120 with sealing bracket 770 extending from the rear door pillar 147.

The outer rear transverse seal 327 includes a deformable panel 740 secured to the door 120 with a mount 750. The mount 750 may include a bracket or a clip joinable to or integrated in the door 120. In various embodiments, the deformable panel 740 is disposed on the outer surface 320 of the door 120 adjacent to the rear edge 127 and engages a structure within the pocket 126 to provide a seal for the outer surface 320 of the door 120 without obstructing movement of the door 120 into and out of the pocket 126. In various embodiments, the deformable panel 740 engages a sealing bracket 790 from the pocket 126. The deformable panel 740 is mounted so that, in an undeformed position 742 (represented by dotted lines in FIG. 7), the deformable panel 740 extends toward the sealing bracket 790 such that the deformable panel 740 would intersect the surface of the sealing bracket 790. When the door 120 is moved into a closed position, the deformable panel 740 conforms to the surface of the sealing bracket 720 in a deformed position 744. With the deformable panel 740 in the deformed position 744, the deformable panel 740 seals the outer surface 320 of the door 120 to the surface of the sealing bracket 790 pocket 126. Thus, the inner rear transverse seal 227 and the outer rear transverse seal 327 provide dual seals to seal the door 120 on both the insider surface 220 and the outside surface 320 of the door 120.

In various embodiments, the deformable panels, compressible members, and the surfaces of the sealing brackets may be formed of a flexible material that provides a desired degree of deformability and/or compressibility. In various embodiments, the flexible material may include a synthetic rubber chosen from one of ethylene propylene diene monomer or a thermoplastic.

Figure 8:
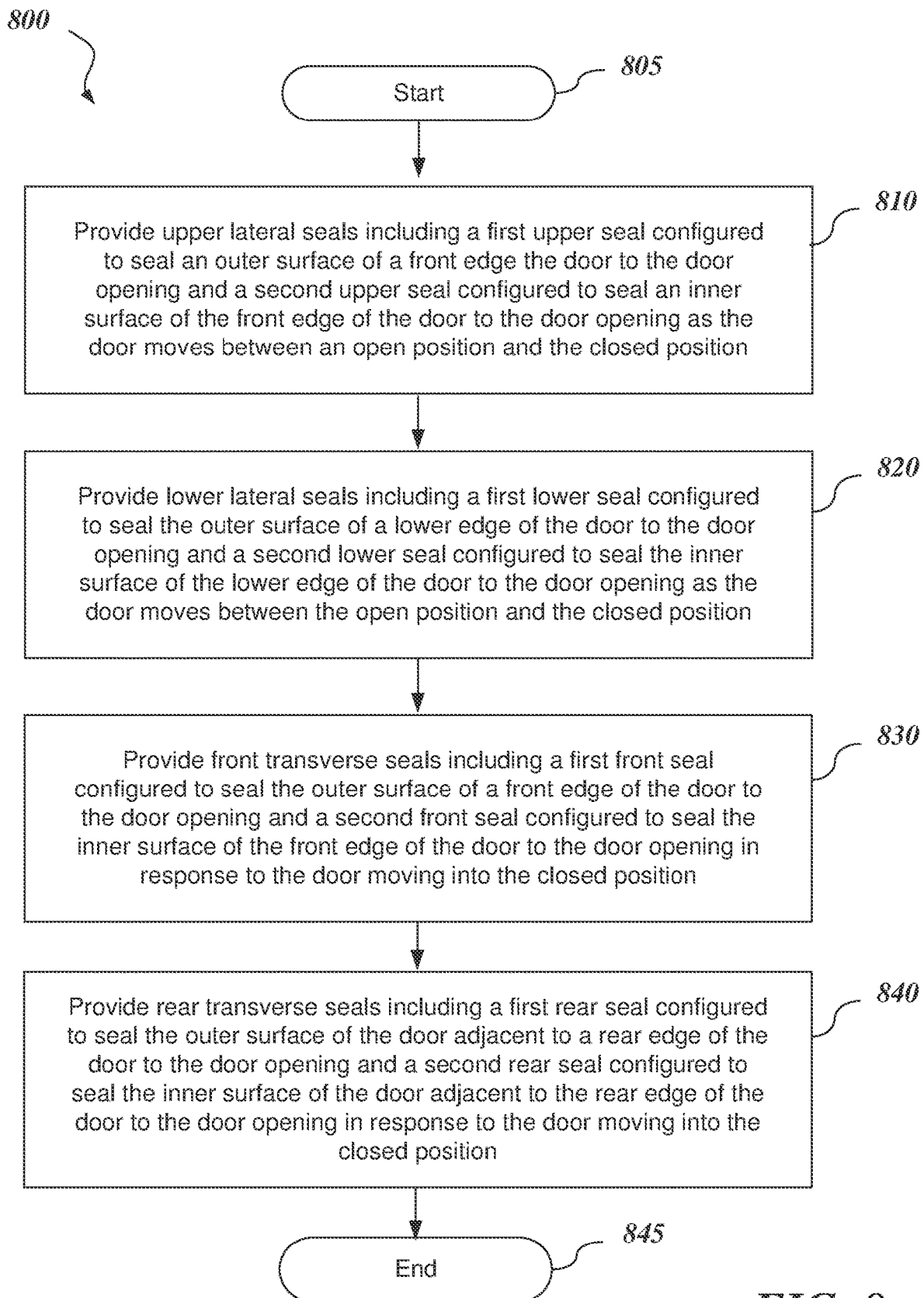
FIG. 8 is a flow chart of an illustrative method of sealing a laterally-travelling door relative to a door opening.

Referring additionally to FIG. 8, in various embodiments an illustrative method 800 for sealing a door that is configured to travel laterally relative to a door opening is provided. The method 800 begins at a block 805. At a block 810, upper lateral seals are provided including a first upper seal configured to seal an outer surface of a front edge the door to the door opening and a second upper seal configured to seal an inner surface of the front edge of the door to the door opening as the door moves between an open position and the closed position. At a block 820, lower lateral seals are provided including a first lower seal configured to seal the outer surface of a lower edge of the door to the door opening and a second lower seal configured to seal the inner surface of the lower edge of the door to the door opening as the door moves between the open position and the closed position. At a block 830, transverse front seals are provided including a first front seal configured to seal the outer surface of a front edge of the door to the door opening and a second front seal configured to seal the inner surface of the front edge of the door to the door opening in response to the door moving into the closed position. At a block 840, transverse rear seals are provided including a first rear seal configured to seal the outer surface of the door adjacent to a rear edge of the door to the door opening and a second rear seal configured to seal the inner surface of the door adjacent to the rear edge of the door to the door opening in response to the door moving into the closed position. The method 800 ends at a block 845.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It will be appreciated that the detailed description set forth above is merely illustrative in nature and variations that do not depart from the gist and/or spirit of the claimed subject matter are intended to be within the scope of the claims. Such variations are not to be regarded as a departure from the spirit and scope of the claimed subject matter.

What is claimed is:

1. A seal assembly comprising:
   a plurality of upper lateral seals for a door configured to travel laterally relative to a door opening, the plurality of upper lateral seals including a first upper seal configured to seal an upper edge of an outer surface of the door against the door opening and a second upper seal configured to seal the upper edge of an inner surface of the door against the door opening as the door laterally moves between an open position and the closed position;
   a plurality of lower lateral seals including a first lower seal configured to seal a lower edge of the outer surface of the door against the door opening and a second lower seal configured to seal the lower edge of the inner surface of the door against the door opening as the door laterally moves between the open position and the closed position;
   a plurality of front transverse seals including a first front seal configured to seal a front edge of the outer surface of the door against the door opening and a second front seal configured to seal the front edge of the inner surface of the door against the door opening in response to the door laterally moving into the closed position; and
   a plurality of rear transverse seals including a first rear seal configured to seal an outer surface of the door adjacent to the rear edge of the door against the door opening and a second rear seal configured to seal an inner surface of the door adjacent to the rear edge of the door against the door opening in response to the door laterally moving into the closed position.

2. The seal assembly of claim 1, wherein the plurality of upper lateral seals and the plurality of lower lateral seals are secured to surfaces of the door and are disposed to deformably engage the door opening as the door is moved into the closed position.

3. The seal assembly of claim 2, further comprising an applique mounted to at least one surface of the door opening and configured to slidably engage at least one of the plurality of upper seals.

4. The seal assembly of claim 2, further comprising a channel secured to an upper surface of the door between the plurality of upper lateral seals and configured to convey liquid received into the channel to an end of the door chosen from a front end of the door and a rear end of the door.

5. The seal assembly of claim 1, wherein the plurality of front transverse seals includes:
   an outer front seal secured to a front surface of the door and configured to deformably engage a front pillar of the door opening as the door is moved into the closed position; and
   an inner front seal secured to the front surface of the door and to compressibly engage the front pillar of the door opening.

6. The seal assembly of claim 1, wherein the plurality of rear transverse seals includes:
   an outer rear seal secured to a rear surface of the door and configured to deformably engage a rear pillar of the door opening as the door is moved into the closed position; and
   an inner rear seal secured to the rear surface of the door and to compressibly engage the rear pillar of the door opening.

7. The seal assembly of claim 6, further comprising a sealing bracket configured to extend from the rear pillar of the door opening to engage the inner rear seal.

8. The seal assembly of claim 1, wherein at least one seal chosen from the plurality of upper lateral seals, the plurality of lower lateral seals, the plurality of front transverse seals, and the plurality of rear transverse seals includes a deformable material.

9. The seal assembly of claim 8, wherein the deformable material includes a synthetic rubber chosen from one of ethylene propylene diene monomer and thermoplastic.

10. A vehicle comprising:
    a vehicle body;
    a drive system supported by the vehicle body and configured to control one or more wheels of the vehicle to motivate, accelerate, decelerate, stop, and steer the vehicle;
    a cabin incorporated in the vehicle body and configured to receive a payload chosen from at least one of an occupant and cargo and accessible by a laterally-travelling door received in a door opening; and
    a seal assembly for a door to the cabin that is configured to travel laterally in a door opening, the seal assembly being configured to seal the door when the door is in a closed position, the seal assembly including:
        a plurality of upper lateral seals including a first upper seal configured to seal an upper edge of an outer surface of the door against the door opening and a second upper seal configured to seal the upper edge of an inner surface of the door against the door opening as the door laterally moves between an open position and the closed position;
        a plurality of lower lateral seals including a first lower seal configured to seal a lower edge of the outer surface of the door against the door opening and a second lower seal configured to seal the lower edge of the inner surface of the door against the door opening as the door laterally moves between the open position and the closed position;
        a plurality of front transverse seals including a first front seal configured to seal a front edge of the outer surface of the door against the door opening and a second front seal configured to seal the front edge of the inner surface of the door against the door opening in response to the door laterally moving into the closed position; and
        a plurality of rear transverse seals including a first rear seal configured to seal an outer surface of the door adjacent to the rear edge of the door against the door opening and a second rear seal configured to seal an inner surface of the door adjacent to the rear edge of the door against the door opening in response to the door laterally moving into the closed position.

11. The vehicle of claim 10, wherein the plurality of upper lateral seals and the plurality of lower lateral seals are secured to surfaces of the door and are disposed to deformably engage the door opening as the door is moved into the closed position.

12. The vehicle of claim 11, further comprising an applique mounted to at least one surface of the door opening and configured to slidably engage at least one of the plurality of upper seals.

13. The vehicle of claim 11, further comprising a channel secured to an upper surfaces of the door between the plurality of upper lateral seals and configured to convey liquid received into the channel to an end of the door chosen from a front end of the door and a rear end of the door.

14. The vehicle of claim 10, wherein the plurality of front transverse seals includes:
    an outer front seal secured to a front surface of the door and configured to deformably engage a front pillar of the door opening as the door is moved into the closed position; and
    an inner front seal secured to the front surface of the door and to compressibly engage the front pillar of the door opening.

15. The vehicle of claim 10, wherein the plurality of rear transverse seals includes:
    an outer rear seal secured to a rear surface of the door and configured to deformably engage a rear pillar of the door opening as the door is moved into the closed position; and
    an inner rear seal secured to the rear surface of the door and to compressibly engage the rear pillar of the door opening.

16. The vehicle of claim 15, further comprising a sealing bracket configured to extend from the rear pillar of the door opening to engage the inner rear seal.

17. The vehicle of claim 10, wherein at least one seal chosen from the plurality of upper lateral seals, the plurality of lower lateral seals, the plurality of front transverse seals, and the plurality of rear transverse seals includes a deformable material.

18. The vehicle of claim 17, wherein the deformable material includes a synthetic rubber chosen from one of ethylene propylene diene monomer and thermoplastic.

19. A method comprising:
    providing a plurality of upper lateral seals for a door configured to travel laterally relative to a door opening, the plurality of upper lateral seals including including a first upper seal configured to seal an outer surface of an upper edge of the door to the door opening and a second upper seal configured to seal an inner surface of the upper edge of the door to the door opening as the door moves between an open position and the closed position;

providing a plurality of lower lateral seals including a first lower seal configured to seal an outer surface of a lower edge of the door to the door opening and a second lower seal configured to seal an inner surface of the lower edge of the door to the door opening as the door moves between the open position and the closed position;

providing a plurality of front transverse seals including a first front seal configured to seal the outer surface of a front edge of the door to the door opening and a second front seal configured to seal the inner surface of the front edge of the door to the door opening in response to the door moving into the closed position; and providing a plurality of rear transverse seals including a first rear seal configured to seal the outer surface of the door adjacent to the rear edge of the door to the door opening and a second rear seal configured to seal the inner surface of the door adjacent to the rear edge of the door to the door opening in response to the door moving into the closed position.

20. The method of claim 19, further comprising securing the plurality of seals to surfaces of the door.

* * * * *